US012578499B2

(12) United States Patent
Kim

(10) Patent No.: US 12,578,499 B2
(45) Date of Patent: Mar. 17, 2026

(54) LAND SUBSIDENCE DETECTION APPARATUS

(71) Applicant: Kwangik Kim, Seoul (KR)

(72) Inventor: Kwangik Kim, Seoul (KR)

( * ) Notice: Subject to any disclaimer, the term of this patent is extended or adjusted under 35 U.S.C. 154(b) by 334 days.

(21) Appl. No.: 18/031,834

(22) PCT Filed: Dec. 13, 2021

(86) PCT No.: PCT/KR2021/018846
§ 371 (c)(1),
(2) Date: Apr. 13, 2023

(87) PCT Pub. No.: WO2022/131714
PCT Pub. Date: Jun. 23, 2022

(65) Prior Publication Data
US 2023/0384477 A1      Nov. 30, 2023

(30) Foreign Application Priority Data

Dec. 18, 2020      (KR) ........................ 10-2020-0178513

(51) Int. Cl.
*G01V 8/26*      (2006.01)
*G01V 8/18*      (2006.01)
*G01V 11/00*      (2006.01)

(52) U.S. Cl.
CPC ................. *G01V 8/26* (2013.01); *G01V 8/18* (2013.01); *G01V 11/00* (2013.01); *G01V 11/005* (2013.01)

(58) Field of Classification Search
CPC . G01V 8/18; G01V 8/26; G01V 11/00; G01V 11/005
See application file for complete search history.

(56) References Cited

U.S. PATENT DOCUMENTS 9,552,716  B1      1/2017  Scarborough

FOREIGN PATENT DOCUMENTS

| JP | 2005114672 | A | * | 4/2005 |
| KR | 10-2004-0108384 | A | | 12/2004 |
| KR | 10-0670976 | B1 | | 1/2007 |
| KR | 10-1020125 | B1 | | 3/2011 |
| KR | 10-2014-0016718 | A | | 2/2014 |
| KR | 10-1857961 | B1 | | 5/2018 |
| TW | 1638075 | | * | 10/2018 |

OTHER PUBLICATIONS

Translation of KR20040108384.*
Translation of KR20140016718.*

* cited by examiner

*Primary Examiner* — Helen C Kwok
(74) *Attorney, Agent, or Firm* — KORUS Patent, LLC; Seong Il Jeong

(57)      ABSTRACT

The present invention relates to a ground subsidence detection apparatus, which is capable of continuous detection of ground subsidence, predicts the occurrence of sinkholes and thus can preemptively prevent a sinkhole from forming, and due to having a simple structure, can increase durability and reduce cost. Provided is a ground subsidence detection apparatus exhibiting an alarm color using reflection of a light source and a detection weight, which, without using a separate power source, falls due to gravity in the event of cavity formation in the ground, or falls due to ground movement when ground movement occurs.

10 Claims, 7 Drawing Sheets

LAND SUBSIDENCE DETECTION APPARATUS

TECHNICAL FIELD

The present invention relates to a ground subsidence detection apparatus, and more particularly, to a ground subsidence detection apparatus which is capable of continuous detection of ground subsidence, predicts the occurrence of sinkholes and thus can preemptively prevent a sinkhole from forming, and due to having a simple structure, can increase durability and reduce cost.

BACKGROUND ART

In general, sinkholes are also called a so-called phenomenon where ground sinks, which are caused by natural factors such as geology, and artificial factors such as large-scale civil engineering works, water leakage of water supply and sewage pipes, poor excavation, and underground water outflow.

Also, in recent years, sinkholes frequently occur in urban areas, and the number of cases that cause various accidents and damage to human lives is increasing, whereby anxiety about not knowing when and where sinkholes will occur is growing.

Here, the occurrence of sinkholes in urban areas is generally caused by artificial factors such as water leakage of water supply and sewage pipes, and accordingly, various studies on methods for detecting the occurrence of such ground subsidence have been actively conducted in recent years.

Conventional methods for detecting ground subsidence include a method of directly digging a place where ground subsidence is expected to exist, a cone penetration test (CPT) method, and the like. However, these methods have problems that they must destroy the geological layer, do not allow for continuous and constant detection of ground subsidence, and are inefficient in terms of time and money.

Further, recently, a method using ground-penetrating radar (GPR) as a non-destructive method, a method using ground-based interferometric synthetic aperture radar (GB-InSAR), a method using an airborne laser, a method using an infrared image, and the like has been developed. In one example, Korean Patent No. 10-1857961 discloses a sinkhole detection system using infrared image analysis.

However, these methods are similarly impossible to continuously and constantly detect ground subsidence, and require the use of radar and infrared rays. Therefore, the methods not only have complicated structures, but also require separate image processing and analysis, and are inefficient in terms of time and cost.

In addition, the above methods may cause traffic inconvenience when detecting ground subsidence, require highly specialized manpower, and deal with information that is difficult for the general public to access, which makes it difficult to eliminate concerns about sinkholes.

Moreover, since conventional devices for detecting ground subsidence are moved by vehicles, the detection is conducted centering on the roadway, and the sidewalk where pedestrians pass has fallen behind in the order of priority for detection.

DETAILED DESCRIPTION OF THE INVENTION

Technical Problem

It is an object of the present invention to provide a ground subsidence detection apparatus which is capable of continuous detection of ground subsidence, predicts the occurrence of sinkholes and thus can preemptively prevent a sinkhole from forming, and due to having a simple structure, can increase durability and reduce cost.

Technical tasks obtainable from the present invention are not limited to the above-mentioned technical tasks. And, other technical tasks not mentioned herein can be clearly understood from the following description by those having ordinary skill in the technical field to which the present invention pertains.

Technical Solution

According to the present invention, there is provided a ground subsidence detection apparatus exhibiting an alarm color using reflection of a light source and a detection weight, which, without using a separate power source, falls due to gravity in the event of cavity formation in the ground, or falls due to ground movement when ground movement occurs.

In order to achieve the above object, according to one embodiment of the present invention, provided is a ground subsidence detection apparatus comprising: a pipe-shaped main body; a transparent cover that is coupled to one end of the main body; a detection weight that is disposed at the other end of the main body and moves when a cavity in the ground occurs or when movement of the ground occurs; a display unit that is installed within the main body to be connected to the detection weight and has one or more reflective surfaces with a warning color; and a connection unit that connects the detection weight and the display unit, wherein the detection weight moves, the reflective surface is arranged to face the transparent cover, so that the warning color is reflected.

According to some embodiments, the display unit comprises a rotating shaft rotatably installed in the main body; and a reflector installed on the rotating shaft and having one or more reflective surfaces, wherein the connection unit may connect the rotating shaft and the detection weight.

According to some embodiments, the reflector comprises at least three reflective surfaces that form a constant angle with each other, each having a different warning color, and as the detection weight moves, the rotating shaft and the reflector rotate together, and the at least three reflective surfaces may face the transparent cover in sequence.

According to some embodiments, the display unit comprises a rotating shaft rotatably installed in the main body; and a reflector wound around the rotating shaft and having the one or more reflective surface, and the connecting portion may connect the reflector and the detection weight.

According to some embodiments, the display unit further comprises an auxiliary rotating shaft rotatably installed in the main body, and the reflector spanning between the rotating shaft and the auxiliary rotating shaft may be arranged side by side with the transparent cover, facing each other.

According to some embodiments, the reflector comprises at least two reflective surfaces formed in succession, each having a different warning color. As the detection weight moves, the reflector wound around the rotating shaft is unwound, and the at least two reflective surfaces may face the transparent cover in sequence.

According to some embodiments, the ground subsidence detection apparatus further comprises an auxiliary main body coupled within the main body, wherein the transparent cover and the display unit are installed in the auxiliary main body.

According to some embodiments, the ground subsidence detection apparatus may further comprise a flexible pipe whose both ends are connected to the inner surface of the main body and the detection weight, respectively.

According to some embodiments, the main body is formed by being folded, and the transparent cover may be installed at one end of the main body so as to be inclined at a predetermined angle with respect to the direction of gravity.

According to some embodiments, the detection weight may be formed with a plurality of protrusions so as to increase adhesion strength with the ground.

Advantageous Effects

According to the present invention, as the ground subsidence detection apparatus is fixedly installed in the paved ground surface after drilling, continuous detection of ground subsidence, i.e., continuous detection, is possible. Accordingly, by predicting the occurrence of sinkholes, it is possible to take immediate countermeasures and prevent the occurrence of a sinkhole in advance.

In addition, the ground subsidence detection apparatus exhibits an alarm color using reflection of a light source and a detection weight, which, without using a separate power source, falls due to gravity in the event of cavity formation in the ground, or falls due to ground movement when ground movement occurs, and due to having a simple structure, can increase durability and reduce cost.

Moreover, not only professional personal but also ordinary people who move or settle in the area where the ground subsidence detection apparatus is installed can easily determine the ground subsidence by the warning color, so that anxiety about sinkholes can be eliminated, and the role of detection personnel can perform through reporting, thereby reducing the number of personnel.

Further, different warning colors can be displayed depending on the depth of the cavity in the ground, enabling gradual warning. As a large number of ground subsidence detection apparatus are installed at regular intervals, the horizontal size and shape of the cavity can be estimated.

The advantages and effects of the present invention are not limited to the aforesaid, and any other advantages and effects not described herein will be clearly understood by those skilled in the art from descriptions of claims.

BRIEF DESCRIPTION OF THE DRAWINGS

FIG. 3 is a diagram showing a state after a cavity is generated in the ground in

FIG. 2;

DETAILED DESCRIPTION OF THE EMBODIMENTS

Figure 1:
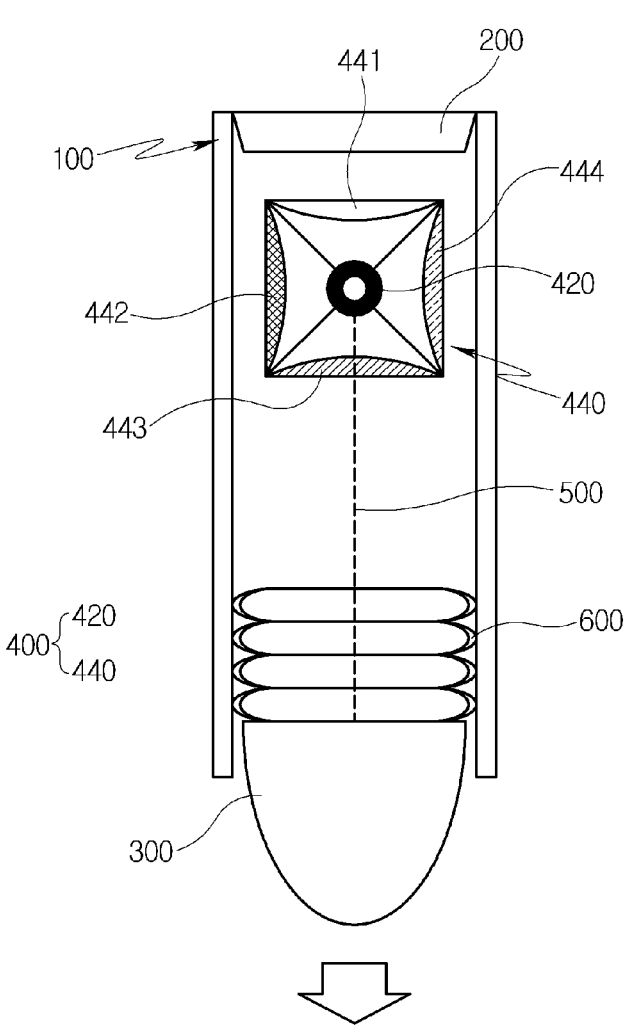
FIG. 1 is a cross-sectional view schematically showing a ground subsidence detection apparatus according to a first embodiment of the present invention.
Figure 2:
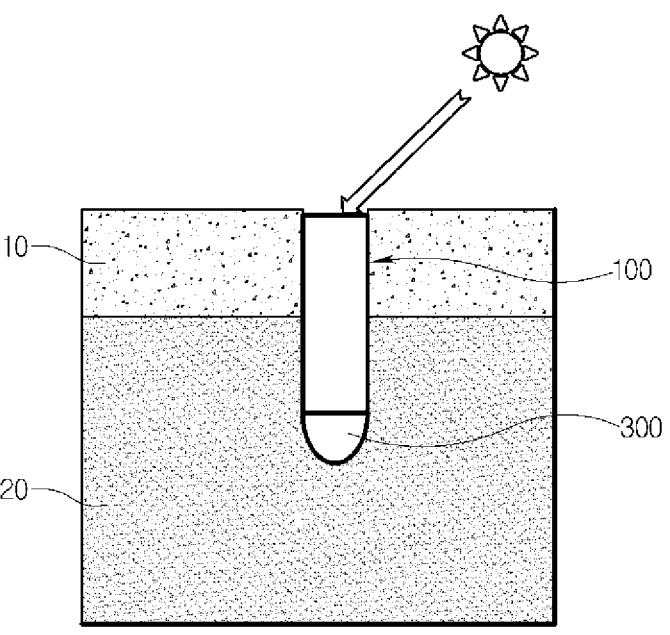
FIG. 2 is a diagram showing a state in which the ground subsidence detection apparatus of FIG. 1 is installed on the paved surface and the ground.

Hereinafter, a preferred embodiment of the ground subsidence detection apparatus of the present invention will be described with reference to the accompanying drawings.

In addition, the terms described below are terms defined considering the functions of the present invention, and these may vary according to user, operator's intention, custom or the like, and the following examples do not limit the scope of the present invention, but are merely illustrative of the components presented in the claims of the present invention.

Portions that are irrelevant to the description will be omitted to clearly describe the present invention, and like reference numerals designate like elements throughout the description. Further, throughout the description, when a portion is referred to as "including" or "comprising" a certain component, it means that the portion can further include other components, without excluding the other components, unless otherwise stated.

First, a ground subsidence detection apparatus according to a first embodiment of the present invention will be described with reference to FIGS. 1 to 5.

The ground subsidence detection apparatus according to the first embodiment of the present invention may largely include a main body 100, a transparent cover 200, a detection weight 300, a display unit 400, and a connection unit 500.

The main body 100 is installed on the paved surface 10 and the ground 20, and is made in a pipe shape. A transparent cover 200 is coupled to the upper end of the main body 100 to identify a warning color, and the inside of the main body 100 can be sealed by the transparent cover 200. In the present embodiment, the ground subsidence detection apparatus is illustrated as being installed over the paved surface 10 and the ground 20, but is not limited thereto, and it can be installed anywhere to detect ground subsidence.

The detection weight 300 is arranged at the lower end of the main body 100 so as to be in contact with the ground. In the present embodiment, the detection weight 300 is arranged so as to be at least partially exposed at the lower end of the main body 100 and is embedded into the ground.

Inside the main body 100, a display unit 400 connected to the detection weight 300 and having one or more reflective surfaces with a warning color is installed so as to display a warning color according to the movement of the detection weight 300. The detection weight 300 and the display unit 400 are connected by a connection unit 500.

Specifically, in the present embodiment, the display unit 400 includes a rotating shaft 420 rotatably installed in the main body 100, and a reflector 440 installed on the rotating shaft 420 and having one or more reflective surfaces. The reflector 440 includes one basic surface 441 that does not reflect and three reflective surfaces 442, 443, and 444 each having a different warning color. At this time, the basic surface 441 and the three reflective surfaces 442, 443 and 444 are disposed at an angle of 90° to each other. For example, the three reflective surfaces 442, 443 and 444 may consist of a reflective surface 442 having a green color, a reflective surface 443 having a yellow color, and a reflective surface 444 having a red color.

The ground subsidence detection apparatus is installed so that the basic surface 441 faces the transparent cover 200 at the time of initial installation, and does not reflect external light sources in the basic state. The three reflective surfaces 442, 443 and 444 are arranged such that a reflective surface 442 having a green color, a reflective surface 443 having a yellow color, and a reflective surface 444 having a red color can face the transparent cover 200 in sequence.

However, without being not limited thereto, according to some embodiments, it goes without saying that the reflector 440 includes only the reflective surface without including the base surface, and thus can be installed such that the reflective surfaces can face the transparent cover 200 at the time of initial installation of the ground subsidence detection apparatus.

The connection unit 500 connects the rotating shaft 420 and the detection weight 300. For this purpose, one end of the connection unit 500 may be fixed while being wound around the rotating shaft 420, and the other end may be fixed to the detection weight 300.

Next, the operating principle of the ground subsidence detection apparatus when a cavity is generated in the ground 20 will be described.

When a cavity occurs inside the ground 20 supporting the detection weight 300, the force supporting the detection weight 300 disappears and the detection weight 300 descends due to gravity. When the detection weight 300 descends, the rotating shaft 420 is rotated by the connection unit 500, and the reflector 440 also rotates therewith.

Figure 3:
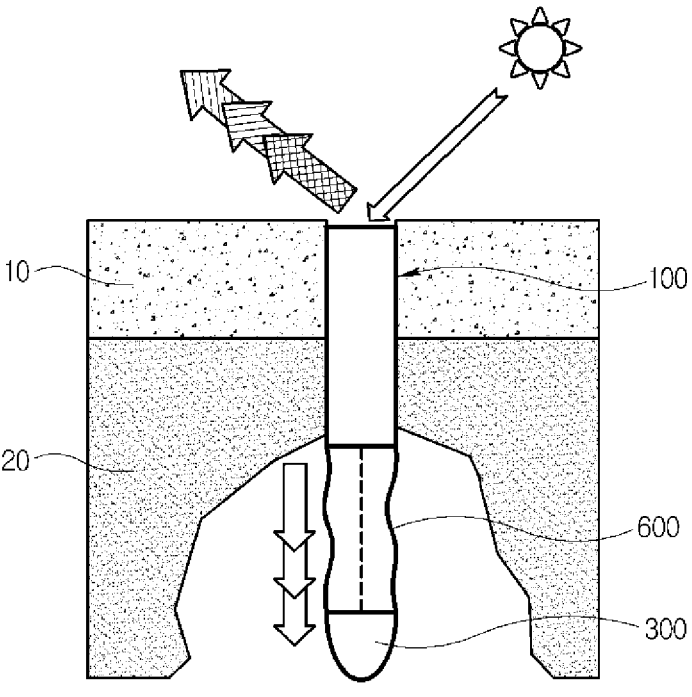

Accordingly, in the initial state in which the basic surface 441 is arranged to face the transparent cover 200, one of the three reflective surfaces 442, 443 and 444 is arranged to face the transparent cover 200, so that the warning color can be reflected. Specifically, since the rotation angle of the reflector 440 varies according to the descending depth of the detection weight 300, the warning color may be displayed in stages. That is, as the descending depth of the detection weight 300 deepens, the rotation angle of the reflector 440 increases, whereby as shown in FIG. 3, as the descending depth of the detection weight 300 deepens, a reflective surface 442 having a green color, a reflective surface 443 having a yellow color, and a reflective surface 444 having a red color can face the transparent cover 200 in sequence, so that green, yellow, and red colors can be reflected in sequence. In the figure, green is represented by a grid pattern, yellow is represented by a hatched pattern of solid lines, and red is represented by a hatched pattern in which solid and dotted lines are alternately repeated. For example, in FIG. 3, arrows in a grid pattern represent reflected green light, arrows in a solid hatched pattern represent reflected yellow light, and arrows in a solid and dotted line represent reflected red light.

In this way, since the depth of the cavity can be detected according to the warning color, immediate action is possible. At this time, various light sources such as sunlight, street lights, automobile lights, and flashlights can be used as an external light source for reflection of the reflective surface.

According to some embodiments, the ground subsidence detection apparatus of the present invention may further include a flexible pipe 600 having both ends connected to the inner surface of the main body 100 and the detection weight 300, respectively. Accordingly, the flexible pipe 600 protects the inside of the main body 100 while extending together when the detection weight 300 descends, thereby preventing foreign matter from entering. Moreover, the flexible pipe 600 helps to maintain in a vertical state when the detection weight 300 descends, thereby reducing the error in the depth detection result or limiting the length of the flexible pipe 600, so that the detection weight 300 can also perform the function to limit the depth to which it can descend. The flexible pipe 600 can be formed of, for example, a flexible material, a corrugated pipe, or the like.

Figure 4:
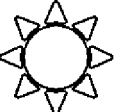
FIG. 4 is a diagram showing a state in which a plurality of ground subsidence detection apparatuses of FIG. 1 installed at regular intervals.
Figure 4:
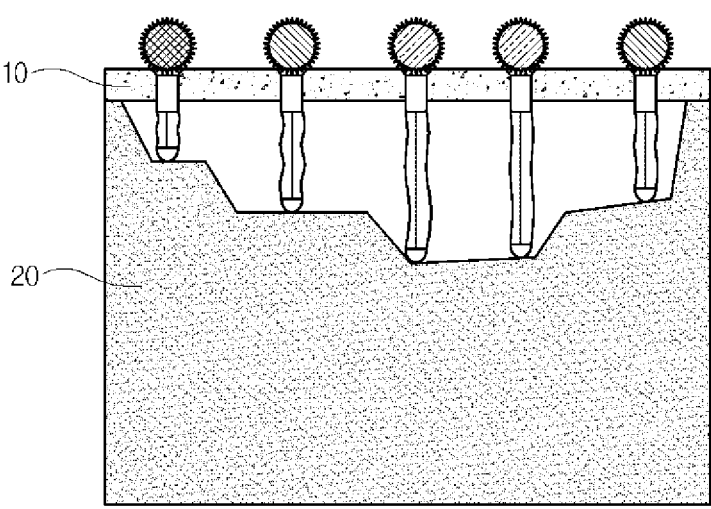
Figure 5:
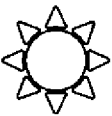
FIG. 5 is a diagram showing a state of FIG. 4 viewed from the ground.
Figure 5:
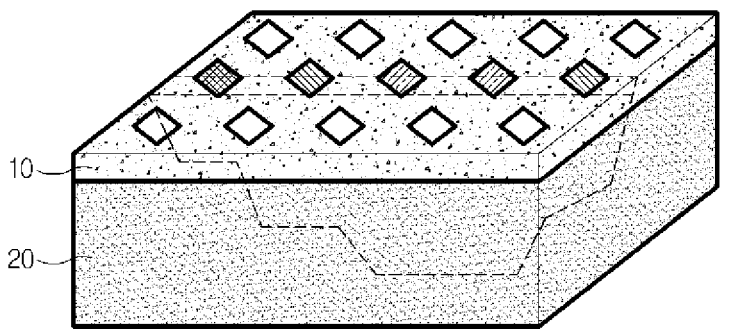

As shown in FIGS. 4 and 5, when a plurality of ground subsidence detection apparatus of the present invention are installed at regular intervals, it is possible to grasp from where to where the cavity has occurred, that is, the horizontal size of the cavity, depending on whether the warning color of each ground subsidence detection apparatus appears. Moreover, the depth of the cavity can be detected through the warning color of each ground subsidence detection apparatus, so that the rough shape of the cavity can also be grasped.

In the above embodiment, it is described that the force supporting the detection weight 300 disappears when a cavity occurs in the ground 20, and the detection weight 300 descends due to gravity, without being limited thereto. However, it goes without saying that the detection weight 300 may descend due to the movement of the ground. For this purpose, a plurality of protrusions may be formed on the detection weight 300 so as to increase the adhesion strength with the ground 20.

Figure 6:
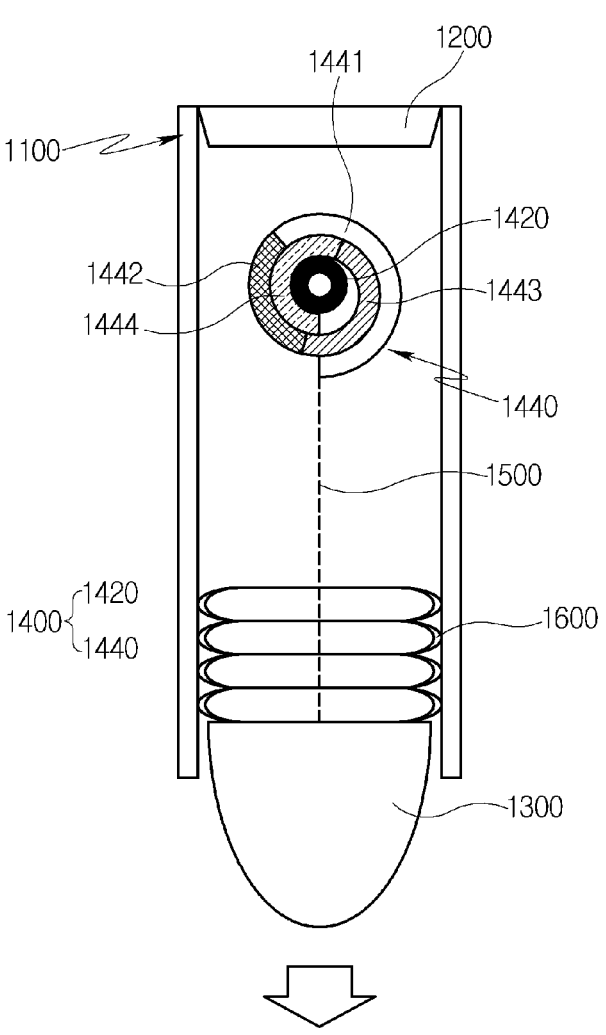
FIG. 6 is a cross-sectional view schematically showing a ground subsidence detection apparatus according to a second embodiment of the present invention.

Next, a ground subsidence detection apparatus according to a second embodiment of the present invention will be described with reference to FIG. 6.

The ground subsidence detection apparatus according to the second embodiment of the present invention largely includes a main body 1100, a transparent cover 1200, a detection weight 1300, a display unit 1400, a connection unit 1500, and a flexible pipe 1600. Here, since the structures of the main body 1100, the transparent cover 1200, the detection weight 1300, and the flexible pipe 1600 are the same as those discussed in FIG. 1, a detailed description thereof will be omitted.

Specifically, in the present embodiment, the display unit 1400 includes a rotating shaft 1420 rotatably installed in the main body 100, and a reflector 1440 wound around a rotating shaft 1420 and having one or more reflective surfaces. The reflector 1440 includes one basic surface 1441 where no reflection does not occur and three reflective surfaces 1442, 1443 and 1444 each having a different warning color, wherein the base surface 1441 and the three reflective surfaces 1442, 1443 and 1444 are continued and formed in succession. Similarly, the three reflective surfaces 1442, 1443 and 1444 may consist of a reflective surface 1442 having a green color, a reflective surface 1443 having a yellow color, and a reflective surface 1444 having a red color.

The ground subsidence detection apparatus is installed so that the basic surface 1441 faces the transparent cover 1200 at the time of initial installation, so that it does not reflect external light sources in the basic state. The three reflective surfaces 1442, 1443 and 1444 are arranged so that as the reflector 1440 is unwound along with the rotation of the rotating shaft 1420, a reflective surface 1442 having a green color, a reflective surface 1443 having a yellow color, and a reflective surface 1444 having a red color may face the transparent cover 1200 in sequence.

However, without being not limited thereto, according to some embodiments, it goes without saying that the reflector 1440 includes only the reflective surface without including the base surface, and thus can be installed such that the reflective surface may face the transparent cover 1200 at the time of initial installation of the ground subsidence detection apparatus.

The connection unit 1500 connects the reflector 1440 and the detection weight 1300. For this purpose, one end of the connection unit 1500 may be fixed to the reflector 1440, and the other end may be fixed to the detection weight 1300.

Next, the operating principle of the ground subsidence detection apparatus when a cavity is generated in the ground 20 will be described.

When a cavity occurs inside the ground 20, the force supporting the detection weight 1300 disappears and the detection weight 1300 descends due to gravity. When the detection weight 1300 descends, the reflector 1440 is unwound by the connection unit 1500, and the rotating shaft 1420 rotates so that the reflector 1440 wound thereon is unwound.

Accordingly, in the initial state in which the basic surface 1441 is arranged to face the transparent cover 1200, one of the three reflective surfaces 1442, 1443 and 1444 is arranged to face the transparent cover 1200, so that the warning color can be reflected. Specifically, since the unwinding length of the reflector 1440 varies depending on the descending depth of the detection weight 1300, the warning colors can be displayed in stages. That is, as the descending depth of the detection shaft 1300 increases, a reflective surface 1442 having a green color, a reflective surface 1443 having a yellow color, and a reflective surface 1444 having a red color may face the transparent cover 1200 in sequence, so that green, yellow, and red colors can be reflected in sequence.

Figure 7:
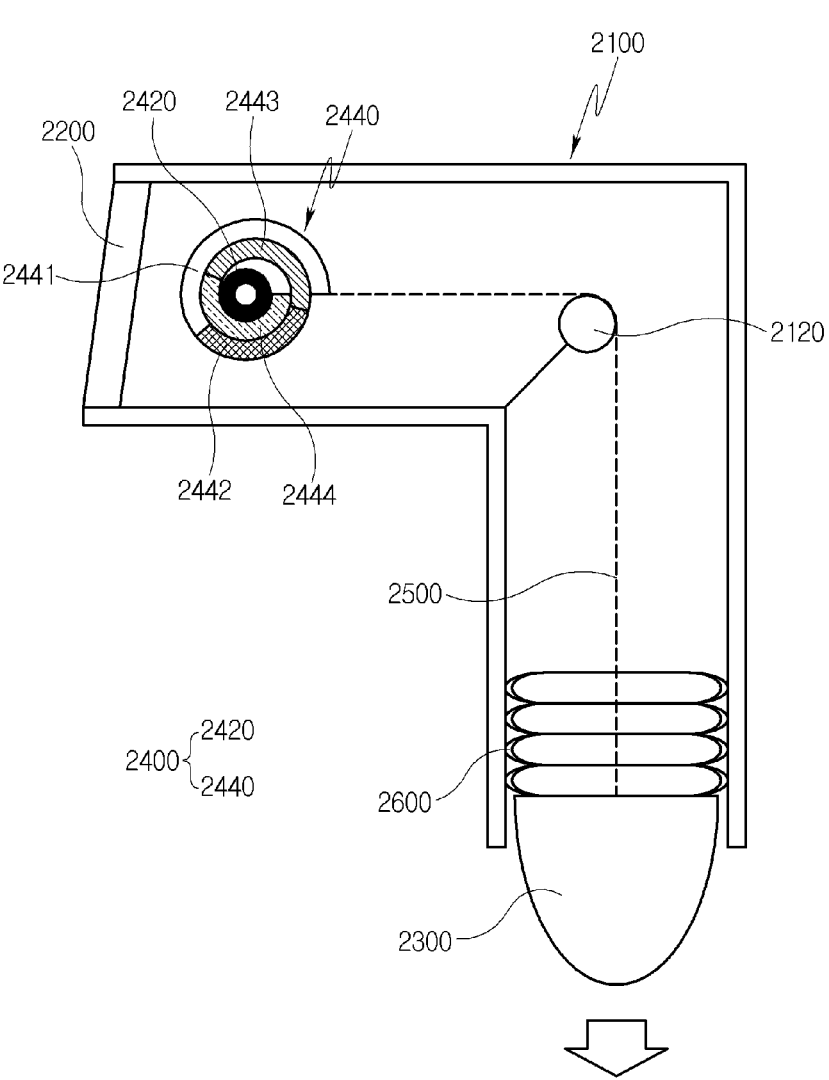
FIG. 7 is a cross-sectional view schematically showing a ground subsidence detection apparatus according to a third embodiment of the present invention.

Next, a ground subsidence detection apparatus according to a third embodiment of the present invention will be described with reference to FIG. 7.

The ground subsidence detection apparatus according to the third embodiment of the present invention largely includes a main body 2100, a transparent cover 2200, a detection weight 2300, a display unit 2400, a connection unit 2500 and a flexible pipe 2600. Here, the above structures are basically the same as those of FIG. 6, but the difference is that the main body 2100 is folded at 90 degrees to form a ¬-shape. As the main body 2100 is folded, the connection unit 2500 must also be folded to connect the reflector 2440 and the detection weight 2300, and a support part 2120 is provided inside the main body 2100 to support the folded part of the connection unit 2500.

At this time, the transparent cover 2200 is coupled to the upper end of the main body 2100, but may be provided in parallel to the direction of gravity, but it is preferably inclined at a certain angle with respect to the direction of gravity so that sunlight can enter the body 2100 more easily.

According to the present embodiment, it goes without saying that the ground subsidence detection apparatus of the present invention not only can be installed in a direction vertical to a paved surface horizontally paved on the ground, such as a road, but also can also be installed on a vertically paved surface such as a retaining wall. In addition, it may be installed over the pillars and ground of a building or the foundation and ground of a building.

Figure 8:
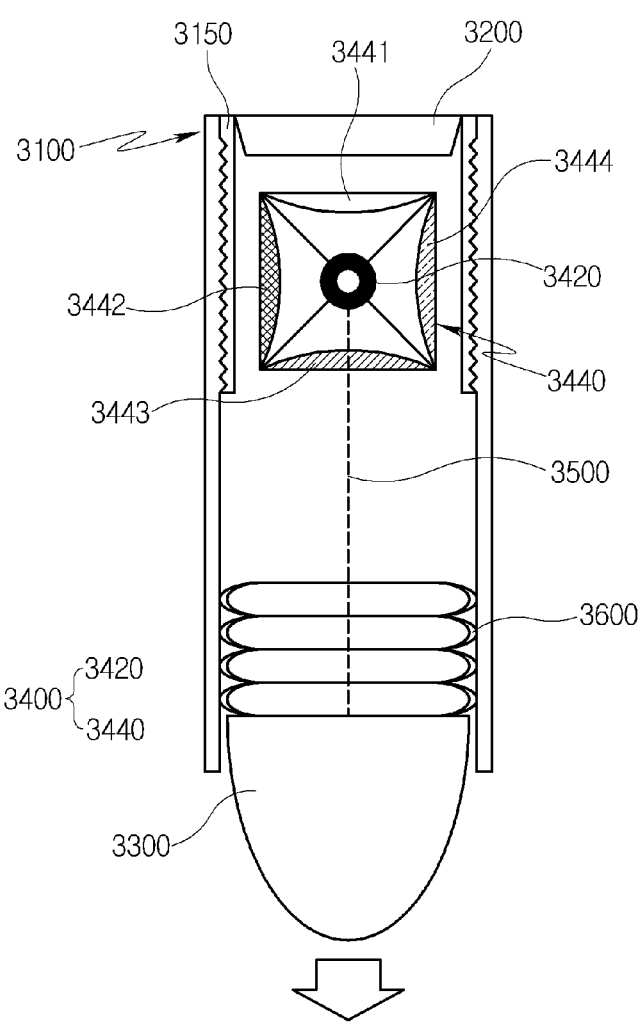
FIG. 8 is a cross-sectional view schematically showing a ground subsidence detection apparatus according to a fourth embodiment of the present invention.

Next, the ground subsidence detection apparatus according to a fourth embodiment of the present invention will be described with reference to FIG. 8.

The ground subsidence detection apparatus according to the fourth embodiment of the present invention largely includes a main body 3100, an auxiliary main body 3150, a transparent cover 3200, a detection weight 3300, a display unit 3400, a connection unit 3500 and a flexible pipe 3600.

Here, the structures of the main body 3100, the transparent cover 3200, the detection weight 3300, the display unit 3400, the connection unit 3500, and the flexible pipe 3600 are basically the same as those discussed in FIG. 1, but the difference is that the transparent cover 3200 and the display unit 3400 are not directly coupled to the inside of the body 3100 but coupled through a separate auxiliary body 3150.

Specifically, the auxiliary main body 3150 is coupled to the main body 3100, and may be provided at an upper end of the main body 3100 as much as the transparent cover 3200 and the display unit 3400 can be disposed inside. In the present embodiment, the main body 3100 and the auxiliary main body 3150 are coupled by screwing, but are not limited thereto, and can be coupled by various methods.

According to the present embodiment, as the auxiliary main body 3150 is easily separated from the main body 3100 after the cavity is detected through the ground subsidence detection apparatus of the present invention, the pipe-shaped main body 3100 that remains attached to the paved surface 10 and the ground 20 may serve as an endoscope camera inlet or a filler inlet for filling the ground.

Figure 9:
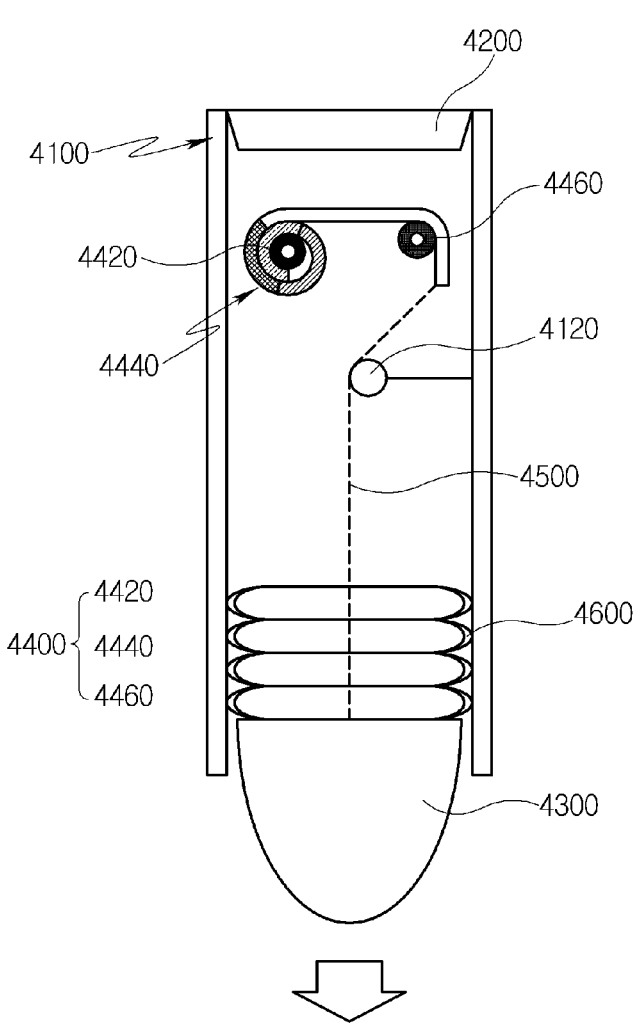
FIG. 9 is a cross-sectional view schematically showing a ground subsidence detection apparatus according to a fifth embodiment of the present invention.

Finally, the ground subsidence detection apparatus according to a fifth embodiment of the present invention will be described with reference to FIG. 9.

The ground subsidence detection apparatus according to the fifth embodiment of the present invention largely includes a main body 4100, a transparent cover 4200, a detection weight 4300, a display unit 4400, a connection unit 4500 and a flexible pipe 4600. Here, the above structures are basically the same as those discussed in FIG. 6, except that the display unit 4400 further includes an auxiliary rotating shaft 4460 rotatably installed in the main body 4100.

Specifically, in the present embodiment, the display unit 4400 includes a rotating shaft 4420, an auxiliary rotating shaft 4460, and a reflector 4440 wound around the rotating shaft 4420 and having one or more reflective surfaces. The reflector 4440 is wound around the rotating shaft 4420 and connected to the connection unit 4500 via the auxiliary rotational shaft 4460. At this time, in order to connect the connection unit 4500 to the center of the detection weight 4300, a support unit 4120 for supporting the connection unit 4500 can be provided inside the main body 4100.

Accordingly, the reflector 4440 spanning between the rotating shaft 4420 and the auxiliary rotating shaft 4460 may be arranged side by side with the transparent cover 4200, facing each other. In the embodiment of FIG. 6, the reflective surface of the reflector 4440 around the rotating shaft 1420 may be larger than the case where the transparent cover 1200 faces the reflective surface.

According to the present invention, as the ground subsidence detection apparatus is fixedly installed in the paved ground surface after drilling, continuous detection of ground subsidence, i.e., continuous detection, is possible. Accordingly, by predicting the occurrence of sinkholes, it is possible to take immediate actions and prevent the occurrence of a sinkhole in advance.

In addition, the ground subsidence detection apparatus exhibits an alarm color using reflection of a light source and a detection weight, which, without using a separate power source, falls due to gravity in the event of cavity formation in the ground, or falls due to ground movement when ground movement occurs, and due to having a simple structure, can increase durability and reduce cost.

Moreover, not only professional personal but also ordinary people who move or settle in the area where the ground subsidence detection apparatus is installed can easily determine the ground subsidence by the warning color, so that anxiety about sinkholes can be eliminated, and the role of detection personnel can perform through reporting, thereby reducing the number of personnel.

Further, different warning colors may be displayed depending on the depth of the cavity in the ground, enabling gradual warning. As a large number of ground subsidence detection apparatus are installed at regular intervals, the horizontal size and shape of the cavity can be estimated.

The present invention is not limited to specific embodiments and descriptions, and various variations and modifications can be made to the invention by those skilled in the art to which the present invention pertains without departing from the scope and spirit of the present invention.

INDUSTRIAL APPLICABILITY

The present invention relates to a ground subsidence detection apparatus, and more particularly, to a ground subsidence detection apparatus which is capable of continuous detection of ground subsidence, predicts the occurrence of sinkholes and thus can preemptively prevent a sinkhole from forming, and due to having a simple structure, can increase durability and reduce cost.

The invention claimed is:

1. A ground subsidence detection apparatus comprising:
a pipe-shaped main body;
a transparent cover that is coupled to one end of the main body;
a detection weight that is disposed at an opposite end of the main body and moves when a cavity in a ground occurs or when movement of the ground occurs;
a display unit that is installed within the main body to be connected to the detection weight and has one or more reflective surfaces with a warning color; and
a connection unit that connects the detection weight and the display unit,
wherein the display unit comprises a rotating shaft rotatably installed in the main body; and a reflector installed on or wound around the rotating shaft and having at least two reflective surfaces, each of the at least two reflective surfaces having a different warning color,
wherein as the detection weight moves, the rotating shaft and the reflector rotate together, wherein the at least two reflective surfaces are arranged to face the transparent cover in sequence, so that a corresponding warning color is reflected through the transparent cover.

2. The ground subsidence detection apparatus of claim 1, wherein the connection unit connects the rotating shaft and the detection weight.

3. The ground subsidence detection apparatus of claim 2, wherein:

the reflector comprises at least three reflective surfaces that form a constant angle with each other, each of the at least three reflective surfaces having a different warning color, and the at least three reflective surfaces are configured to face the transparent cover in sequence as the detection weight moves.

4. The ground subsidence detection apparatus of claim 1, wherein the connection unit connects the reflector and the detection weight.

5. The ground subsidence detection apparatus of claim 4, wherein:

the display unit further comprises an auxiliary rotating shaft rotatably installed in the main body, and the reflector spanning between the rotating shaft and the auxiliary rotating shaft is arranged side by side with the transparent cover, facing each other.

6. The ground subsidence detection apparatus of claim 4, wherein:

the reflector comprises the at least two reflective surfaces formed in succession, each of the at least two reflective surfaces having a different warning color, the reflector wound around the rotating shaft is unwound as the detection weight moves, and the at least two reflective surfaces face the transparent cover in sequence.

7. The ground subsidence detection apparatus of claim 1, further comprising an auxiliary main body coupled within the main body, wherein the transparent cover and the display unit are provided in the auxiliary main body.

8. The ground subsidence detection apparatus of claim 1, further comprising a flexible pipe whose both ends are connected to an inner surface of the main body and the detection weight, respectively.

9. The ground subsidence detection apparatus of claim 1, wherein:

the main body is formed by being folded, and the transparent cover is installed at the one end of the main body so as to be inclined at a predetermined angle with respect to a direction of gravity.

10. The ground subsidence detection apparatus of claim 1, wherein:

the detection weight is formed with a plurality of protrusions so as to increase adhesion strength with the ground.

* * * * *